United States Patent [19]
Barbee

[11] Patent Number: 4,920,008
[45] Date of Patent: Apr. 24, 1990

[54] POWDER COATING COMPOSITIONS

[75] Inventor: Robert B. Barbee, Kingsport, Tenn.

[73] Assignee: Eastman Kodak Company, Rochester, N.Y.

[21] Appl. No.: 325,847

[22] Filed: Mar. 20, 1989

[51] Int. Cl.$^5$ .................... C08L 67/02; B32B 15/08
[52] U.S. Cl. ................................ 428/458; 525/124; 525/440; 525/444
[58] Field of Search ............... 428/458; 525/124, 440, 525/444

[56] References Cited
U.S. PATENT DOCUMENTS
4,352,924 10/1982 Wooten ............................... 525/440

*Primary Examiner*—Patricia Short
*Attorney, Agent, or Firm*—J. Frederick Thomsen; William P. Heath, Jr.

[57] ABSTRACT

Disclosed are thermosetting, powder coating compositions comprised of blends of certain amorphous polyesters and polyether-esters in combination with a blocked polyisocyanate which, when applied to a substrate and heated, provide cross-linked coatings having a combination of desirable properties including good gloss, impact strength and flexibility.

21 Claims, No Drawings

POWDER COATING COMPOSITIONS

This invention concerns novel polymer compositions useful for formulating powder coating compositions. More particularly, this invention concerns novel polymer compositions comprising certain amorphous polyesters, polyether-esters and blocked isocyanates, powder coating compositions based thereon and coatings derived from the powder coating compositions.

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures. However, the curing of thermosetting coatings has created problems in obtaining coatings which have, in addition to the above-stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. Such a coating surface or finish lacks the gloss and luster of coatings typically obtained from thermoplastic compositions. The "orange peel" surface problem has caused thermosetting coatings to be applied from organic solvent systems which are inherently undesirable because of the environmental and safety problems occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

In addition to exhibiting good gloss, impact strength and resistance to solvents and chemicals, coatings derived from thermosetting coating compositions must posses good to excellent flexibility. For example, good flexibility is essential for powder coating compositions used to coat sheet (coil) steel which is destined to be formed or shaped into articles used in the manufacture of various household appliances and automobiles wherein the sheet metal is flexed or bent at various angles.

I have discovered that coatings having good to excellent gloss, impact strength (toughness) and flexibility may be obtained from powder coating compositions comprising an intimate blend, typically in a finely divided form, of:
(1) a novel blend of polymers containing free hydroxy groups comprised of:
 (a) about 40 to 85 weight percent of an amorphous polyester having a glass transition temperature (Tg) of greater than 40° C., a hydroxyl number of about 20 to 200 and an inherent viscosity of about 0.1 to 0.5; and
 (b) about 15 to 60 weight percent of a polyether-ester having a Tg of less than 30° C., a hydroxyl number of about 20 to 200 and an inherent viscosity of about 0.1 to 0.5, and comprised of:
  (i) diacid residues comprised of about 50 to 90 mole percent terephthalic acid and about 50 to 10 mole percent of 1,4-cyclohexanedicarboxylic acid residues; and
  (ii) glycol residues comprised of 1,4-butanediol and poly(oxytetramethylene) glycol residues
 wherein the poly(oxytetramethylene) residues constitute about 15 to 40 weight percent of the polyether-ester and are derived from a poly(oxytetramethylene) glycol having a molecular weight of about 500 to 2000; and
(2) a cross-linking effective amount of a blocked polyisocyanate compound.

I have discovered that the inclusion of the above-described polyether-ester markedly improves the flexibility of coatings prepared from the novel compositions of this invention without any significant decrease in the toughness of the coatings.

Both the amorphous polyester and the polyether-ester may be produced using well-known polycondensation procedures employing an excess of glycol to obtain a polymer having the specified hydroxyl number. The glycol residues of the amorphous polyester component may be derived from a wide variety and number of aliphatic, alicyclic and alicyclic-aromatic glycols or diols containing from 2 to about 10 carbon atoms. Examples of such glycols include ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, 1,4-xylylenediol and the like.

The dicarboxylic acid residues of the amorphous polyester may be derived from various aliphatic, alicyclic, aliphatic-alicyclic and aromatic dicarboxylic acids containing about 4 to 10 carbon atoms or esterforming derivatives thereof such as dialkyl ester and/or anhydrides. Succinic, glutaric, adipic, azelaic, sebacic, fumaric, maleic, itaconic, 1,3-and 1,4-cyclohexanedicarboxylic, phthalic, isophthalic and terephthalic are representative of the dicarboxylic acids from which the diacid residues of the amorphous polyester may be derived. A minor amount, e.g., up to 10 mole percent, of the glycol and/or diacid residues may be replaced with branching agents, e.g., trifunctional residues derived from trimethylolethane, trimethylolpropane and trimellitic anhydride.

The preferred amorphous polyester component of the composition provided by this invention has a Tg greater than 55° C., a hydroxyl number in the range of about 25 to 80, an acid number of not more than 15 and an inherent viscosity of about 0.15 to 0.4. As used herein, the term "amorphous" refers to a polyester which exhibits no, or only a trace of, crystallization or melting point as determined by differential scanning calorimetry (DSC). The amorphous polyester component preferably is comprised of (1) diacid residues of which at least 50 mole percent are terephthalic acid residues, (2) glycol residues of which at least 50 mole percent are derived from 2,2-dimethyl-1,3-propanediol (neopentyl glycol) and (3) up to 10 mole percent, based on the total moles of (2) and (3), of trimethylolpropane residues. These preferred amorphous polyesters are commercially available, e.g., under the names AZS 50 Resin and Cargill Resin 3000, and/or can be prepared according to the procedures described in U.S. Pat. Nos. 3,296,211, 3,842,021, 4,124,570 and 4,264,751 and Published Japanese Patent Applications (Kokai) 73-05,895 and 73-26,292. The most preferred amorphous polyester consists essentially of terephthalic acid residues, 2,2-dimethyl-1,3-propanediol residues and up to 10 mole percent, based on the total moles of trimethylolpropane and 2,2-dimethyl-1,3-propanediol residues, of trimethylolpropane residues and having a Tg of about 50° to 65° C., a hydroxyl number of about 35 to 60, an acid number of less than 10 and an inherent viscosity of about 0.1 to 0.25.

The polyether-ester component of my novel compositions has a Tg of less than 30° C., a melting point of about 70° to 200° C., a hydroxyl number of about 20 to 200, and an inherent viscosity of about 0.1 to 0.5. The polyether-ester is a segmented polymer containing dicarboxylic acid residues and glycol residues derived from both a long chain polyether glycol, such as poly(oxytetramethylene) glycol having a molecular weight of about 1000, and a short chain glycol such as 1,4-butanediol. The polyether-ester has a discernable crystallization or melting point by DSC. The polyether-ester component preferably has a Tg of less than 0° C., a melting point of 100° to 170° C., a hydroxyl number of about 25 to 80, an acid number of not more than 15 and an inherent viscosity of about 0.15 to 0.4.

The polyether-ester component, in addition to the residues specified hereinabove, may contain minor amounts, e.g., up to 10 mole percent based on a total glycol residue content of 100 mole percent and a total diacid residue content of 100 mole percent, of other diacid and glycol residues such as the residues of ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, 1,4-xylylenediol and residues of succinic, glutaric, adipic, azelaic, sebacic, fumaric, maleic, itaconic, 1,3-cyclohexanedicarboxylic, phthalic and/or isophthalic acids. However, the polyether-ester normally consists essentially of residues of terephthalic acid, 1,4-butanediol and the poly(oxytetramethylene) glycol described above. The 1,4-cyclohexanedicarboxylic acid or its dialkyl ester used in the preparation of the polyether-esters may be the trans isomer, the cis isomer or a mixture of such isomers. Preferably, the cis:trans ratio is in the range of about 35:65 to about 65:35. The preferred polyether-ester comprises (1) diacid residues comprised of about 60 to 80 mole percent terephthalic acid residues and about 20 to 40 mole percent of 1,4-cyclohexanedicarboxylic acid residues, preferably having a trans isomer content of about 35 to 65 mole percent and (2) glycol residues comprised of about 91 to 95 mole percent 1,4-butanediol residues and about 5 to 9 mole percent of poly(oxytetramethylene) glycol residues, wherein the poly(oxytetramethylene) glycol residues constitute about 20 to 30 weight percent of the polyether-ester and are derived from a poly(oxytetramethylene) glycol having a molecular weight of about 750 to 1500. An especially preferred polyether-ester component is comprised of 70 mole percent terephthalic acid residues, 30 mole percent 1,4-cyclohexanedicarboxylic acid residues, 1,4-butanediol residues and poly(oxytetramethylene) glycol residues derived from poly(oxytetramethylene) glycol having a molecular weight of about 1000, wherein the poly(oxytetramethylene) residues constitute about 25 weight percent of the polyether-ester.

The relative amounts of the amorphous polyester and the polyether-ester can be varied substantially depending on a number of factors such as the properties and characteristics of the particular amorphous polyester and polyesther-ester employed, the cross-linking agent and the amount thereof being used, the degree of pigment loading, the properties required of the coatings to be prepared from the compositions, etc. As provided above, the compositions of this invention comprise a blend of about 40 to 85 weight percent of the amorphous polyester and about 15 to 60 weight percent of the polyether-ester. The blend of polymers containing free hydroxy groups provided by this invention preferably is comprised of about 60 to 80 weight percent of the amorphous polyester and about 20 to 40 weight percent of the polyether-ester.

The blocked polyisocyanate compounds of the compositions of this invention are known compounds and can be obtained from commercial sources or may be prepared according to published procedures. Upon being heated to cure coatings of the compositions, the compounds are unblocked and the isocyanate groups react with hydroxy groups present on the amorphous polyester and polyether-ester to cross-link the polymer chains and thus cure the compositions to form tough coatings. Examples of the blocked polyisocyanate cross-linking component include those which are based on isophorone diisocyanate blocked with ε-caprolactam, commercially available as Hüls 1530 and Cargill 2400, or toluene 2,4-diisocyanate blocked with ε-caprolactam, commercially available as Cargill 2450, and phenol-blocked hexamethylene diisocyanate.

The most readily-available, and thus the preferred, blocked polyisocyanate cross-linking agents or compounds are those commonly referred to as ε-caprolactam-blocked isophorone diisocyanate, e.g., those described in U.S. Pat. Nos. 3,822,240, 4,150,211 and 4,212,962. However, the products marketed as ε-caprolactam-blocked isophorone diisocyanate may consist primarily of the blocked, difunctional, monomeric isophorone diisocyanate, i.e., a mixture of the cis and trans isomers of 3-isocyanatomethyl-3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the ε-caprolactam-blocked, difunctional, monomeric isophorone diisocyanate and the ε-caprolactam-blocked, trifunctional trimer of isophorone diisocyanate. The description herein of the cross-linking agents as "polyisocyanates" refers to compounds which contain at least two isocyanato groups which are blocked with, i.e., reacted with, another compound, e.g., ε-caprolactam. The reaction of the isocyanato groups with the blocking compound is reversible at elevated temperatures, e.g., about 150° C. and above, at which temperature the isocyanato groups are available to react with the hydroxyl groups present on the amorphous polyester and the polyether-ester to form urethane linkages.

The amount of the blocked diisocyanate cross-linking compound present in the compositions of my invention can be varied depending on several factors such as those mentioned hereinabove relative to the amount of amorphous polyester and polyether-ester utilized. Typically, the amount of cross-linking compound which will effectively cross-link the hydroxy-containing polymers to produce coatings having a good combination of properties is in the range of about 5 to 30 weight percent, preferably 15 to 25 weight percent, based on the total weight of the amorphous polyester, the polyether-ester and the cross-linking compound.

The powder coating compositions of my invention may be prepared from the compositions described herein by dry-mixing and then melt-blending the amorphous polyester, the polyether-ester and the blocked polyisocyanate compound, along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a Brabender extruder at 90° to 130° C., granulated and finally ground. The melt blending should be carried out at a temperature sufficiently low to prevent the unblocking of the polyisocyanate cross-linking compound and thus avoid premature cross-linking. To minimize the exposure of the blocked polyisocyanate to elevated temperatures, the amorphous polyester and the polyether-ester may be blended prior to the incorporation therein of the blocked polyisocyanate compound.

Typical of the additives which may be present in the powder coating compositions include benzoin, used to reduce entrapped air or volatiles, flow aids or flow control agents which aid the formation of a smooth, glossy surface, catalysts to promote the cross-linking reaction between the isocyanate groups of the cross-linking agent and the hydroxyl groups on the polymers, stabilizers, pigments and dyes. Although it is possible to cure or cross-link the composition without the use of a catalyst, it is usually desirable to employ a catalyst to aid the cross-linking reaction, e.g., in an amount of about 0.05 to 2.0 weight percent cross-linking catalyst based on the total weight of the amorphous polyester, the polyether-ester and the cross-linking agent. Suitable catalysts for promoting the cross-linking include organo-tin compounds such as dibutyltin dilaurate, dibutyltin dimaleate, dibutyltin oxide, stannous octanoate and similar compounds.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., Modaflow from Monsanto Company and Acronal from BASF. Other flow control agents which may be used include Modarez MFP available from Synthron, EX 486 available from Troy Chemical, BYK 360P available from BYK Mallinkrodt and Perenol F-30-P available from Henkel. A specific flow aid is an acrylic polymer having a molecular weight of about 17,000 and containing 60 mole percent 2-ethylhexyl methacrylate residues and about 40 mole percent ethyl acrylate residues. The amount of flow aid present may be in the range of about 0.5 to 4.0 weight percent, based on the total weight of the amorphous polyester, the polyether-ester and the cross-linking agent.

The powder coating compositions may be deposited on various metallic and non-metallic substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also affects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coating of 40 to 120 microns thickness may be obtained.

Another method of applying the powder coating compositions is the electrostatic fluidized bed process which is a combination of the two methods described above. For example, annular or partially annular electrodes are mounted over a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistant materials such as glass, ceramic and various metal materials. The compositions are especially useful for producing coatings on articles constructed of metals and metal alloys, particularly steel articles.

The compositions and coatings of my invention are further illustrated by the following examples. The inherent viscosities (I.V.; dl/g) referred to herein were measured at 25° C. using 0.5 g polymer per 100 mL of a solvent consisting of 60 parts by weight phenol and 40 parts by weight tetrachloroethane. Acid and hydroxyl numbers were determined by titration and are reported herein as mg of KOH consumed for each gram of polymer. The glass transition temperatures (Tg) and the melting temperatures (Tm) were determined by differential scanning calorimetry (DSC) on the second heating cycle at a scanning rate of 20° C. per minute after the sample has been heated to melt and quenched to below the Tg of the polymer. Tg values are reported as the midpoint of the transition and Tm at peaks of transitions.

Coatings were prepared on 3 inch by 9 inch panels of 24-gauge, polished, cold roll steel, the surface of which has been zinc phosphated (Bonderite 37, The Parker Company). Impact strengths were determined using an impact tester (Gardner Laboratory, Inc.) according to ASTM D2794-84. A weight with a ⅝-inch diameter, hemispherical nose was dropped within a slide tube from a specified height to drive into the front (coated face) or back of the panel. The highest impact which did not crack the coating was recorded in inch-pounds, front and reverse. The 20° and 60° gloss values were measured using a multi-angle, analog laboratory glossmeter.

The flexibility of the coatings was determined by a bend test, similar to ASTM D4145, wherein a coated panel was bent 180°, i.e., bent or folded back against itself, using a hydraulic jack pressurized to 20,000 pounds per square inch (psi). Bend tests also were performed by positioning 2 coated panels adjacent to the panel being bent so that the completely bent panel resulted in a 4-layer sandwich: the top and bottom layers being the panel bent and the 2 inner layers being the 2 coated panels positioned as described. The bend tests were performed at 23° and 50° C. After a panel was bent, the crease or fold was inspected for coating fractures and cracking. The above-described flexibility test was used since art-recognized tests such as the ASTM D522 flexibility test are not sufficiently severe to determine whether coatings possess the degree of flexibility required in many end uses. Although the bend test used is excessively severe for most purposes for which coated articles are used, it provides a means to compare the flexibilities of different powder coating compositions.

EXAMPLE 1

A 500 mL, 3-necked, round-bottom flask was charged with terephthalic acid (191.04 g, 1.150 mol), 1,4-cyclohexanedicarboxylic acid (84.85 g, 0.493 mol), 1,4-butanediol (158.97 g, 1.766 mol), poly(oxytetramethylene) glycol having a molecular weight of 1000 (128.91 g, 0.129 mol), 1.0 g 2,2-bis[[3-[3,5-bis(1,1-dimethylethyl)-4-hydroxyphenyl]-1-oxopropoxy]methyl]-1,3-propanediyl 3,5-bis(1,1-dimethylethyl)-4-hydroxybenzenepropanoate (Irganox 1010 stabilizer) and 0.5 g butyl stannoic acid. The contents of the flask were heated to and maintained, under nitrogen, at 200° C. for 2 hours with stirring. The temperature then was raised to 215° C. for 2 hours while distilling off water from the reaction mixture. The reaction mixture then was heated at 230° C. for 8 hours. The molten polymer was poured into a syrup can where it was allowed to cool to a white solid. The polyether-ester thus obtained had an I.V. of 0.30, a Tm of 161° C., a hydroxyl number of 35 and an acid number of 1.

A powder coating composition was prepared from the following materials:
65.20 g: Polyether-ester prepared as described in the preceding paragraph;
260.82 g: Amorphous polyester - AZS 50, a polyester in which the diacid component is 100 mole percent terephthalic acid residue and the polyhydroxy component is 91.5 mole percent 2,2-dimethyl-1,3-propanediol and 8.5 mole percent trimethylolpropane;
73.98 g: Caprolactam-blocked isophorone polyisocyanate (Hüls 1530);
2.9 g: Dibutyltin dilaurate;
2.9 g: Benzoin;
8.0 g: Modaflow flow control agent; and
160.0 g: Titanium dioxide.

The above materials were mixed in a Banbury mixer at 80° C. for five minutes, ground in a Bantam mill to which a stream of liquid nitrogen was fed and classified through a 200 mesh screen on an Alpine sieve. The finely-divided, powder coating composition obtained had an average particle size of about 50 microns.

EXAMPLE 2

The powder coating composition prepared in Example 1 was applied electrostatically to one side of the 3 inch by 9 inch panels described hereinabove. The coatings were cured (cross-linked) by heating the coated panels at 177° C. in an oven for 25 minutes. The cured coatings were about 50 microns thick.

The coatings on the panels had both front and back impact strengths of >160 inch-pounds and 20° and 60° gloss values of 72 and 88, respectively. The results of bend tests performed on two coated panels are set forth in Table I. The column with the heading 23/0T shows the number of coating fractures for panels bent at 23° C. with nothing (zero thicknesses) sandwiched between the two halves of the bent panels. The column with the heading 23/2T shows similar values for panels bent at 23° C. with two coated panels (2 thicknesses) sandwiched between the two halves of the bent panels. The column headed 50/0T shows the number of coating fractures for panels bent at 50° C. with nothing between the two halves of the bent panels.

EXAMPLE 3

A powder coating composition was prepared according to the procedure described in Example 1 from the following ingredients:
98.75 g: Polyether-ester prepared as described in Example 1;
230.41 g: Amorphous polyester - AZS 50, a polyester described in Example 1;
70.84 g: Caprolactam-blocked isophorone diisocyanate (Hüls 1530);
2.9 g: Dibutyltin dilaurate;
2.9 g: Benzoin;
8.0 g: Modaflow flow control agent; and
160.0 g: Titanium dioxide.

Using the procedure of Example 2, panels were coated with this powder coating composition and the coatings were cured and evaluated. The coatings had both front and back impact strengths of >160 inch-pounds and 20° and 60° gloss values of 77 and 92, respectively. The results of bend tests, performed as described in Example 2, are set forth in Table I.

EXAMPLE 4

A powder coating composition was prepared according to the procedure described in Example 1 from the following ingredients:
132.94 g: Polyether-ester prepared as described in Example 1;
199.41 g: Amorphous polyester - AZS 50, a polyester described in Example 1;

67.65 g: Caprolactam-blocked isophorone diisocyanate (Hüls 1530);
2.9 g: Dibutyltin dilaurate;
2.9 g: Benzoin;
8.0 g: Modaflow flow control agent; and
160.0 g: Titanium dioxide.

Using the procedure of Example 2, panels were coated with this powder coating composition and the coatings were cured and evaluated. The coatings had both front and back impact strengths of >160 inch-pounds and 20° and 60° gloss values of 70 and 90, respectively. The results of bend tests, performed as described in Example 2, are set forth in Table I.

EXAMPLE 5

A 500 mL, 3-necked, round-bottom flask was charged with terephthalic acid (217.90 g, 1.312 mol), 1,4-cyclohexanedicarboxylic acid (96.78 g, 0.562 mol), 1,4-butanediol (180.24 g, 2.000 mol), poly(oxytetramethylene) glycol of 1000 molecular weight (72.54 g, 0.073 mol), 1.0 g 2,2-bis[[3-[3,5-bis(1,1-dimethylethyl)-4-hydroxyphenyl]-1-oxopropoxy]methyl]-1,3-propanediyl 3,5-bis(1,1-dimethylethyl)-4-hydroxybenzenepropanoate (Irganox 1010 stabilizer) and 0.5 g butyl stannoic acid. The contents of the flask were heated to and maintained, under nitrogen, at 200° C. for 2 hours with stirring. The temperature then was raised to 215° C. for 2 hours while distilling off water from the reaction mixture. The reaction mixture then was heated at 230° C. for 8 hours. The molten polymer was poured into a syrup can where it was allowed to cool to a white solid. The polyether-ester thus obtained had an I.V. of 0.30, a Tm of 170° C., a hydroxyl number of 25 and an acid number of 1.9.

A powder coating composition was prepared from the following materials:
99.46 g: Polyether-ester prepared as described in the preceding paragraph;
232.08 g: Amorphous polyester - AZS 50, described in Example 1;
68.45 g: Caprolactam-blocked isophorone diisocyanate (Hüls 1530);
2.9 g: Dibutyltin dilaurate;
2.9 g: Benzoin;
8.0 g: Modaflow flow control agent; and
160.0 g: Titanium dioxide.

Using the procedure of Example 2, panels were coated with this powder coating composition and the coatings were cured and evaluated. The coatings had both front and back impact strengths of >160 inch-pounds and 20° and 60° gloss values of 60 and 87, respectively. The results of bend tests, performed as described in Example 2, are set forth in Table I.

EXAMPLE 6

A 500 mL, 3-necked, round-bottom flask is charged with terephthalic acid (169.60 g, 1.021 mol), 1,4-cyclohexanedicarboxylic acid (75.33 g, 0.437 mol), 1,4-butanediol (133.62 g, 1.483 mol), poly(oxytetramethylene) glycol having a molecular weight of 1000 (173.95 g, 0.174 mol), 1.0 g 2,2-bis[[3-[3,5-bis(1,1-dimethylethyl)-4-hydroxyphenyl]-1-oxopropoxy]methyl]-1,3-propanediyl 3,5-bis(1,1-dimethylethyl)-4-hydroxybenzenepropanoate (Irganox 1010 stabilizer) and 0.5 g butyl stannoic acid. The contents of the flask were heated to and maintained, under nitrogen, at 200° C. for 2 hours with stirring. The temperature then was raised to 215° C. for 2 hours while distilling off water from the reaction mixture. The reaction mixture then was heated at 230° C. for 8 hours. The molten polymer was poured into a syrup can where it was allowed to cool to a white solid. The polyether-ester thus obtained contained 35 weight percent of the poly(oxytetramethylene) glycol and had an I.V. of 0.33, a Tm of 150° C., a hydroxyl number of 29 and an acid number of 1.

A powder coating composition was prepared from the following materials:
99.05 g: Polyether-ester prepared as described in the preceding paragraph;
231.12 g: Amorphous polyester - AZS 50, described in Example 1;
69.82 g: Caprolactam-blocked isophorone diisocyanate (Hüls 1530);
2.9 g: Dibutyltin dilaurate;
2.9 g: Benzoin;
8.0 g: Modaflow flow control agent; and
160.0 g: Titanium dioxide.

Using the procedure of Example 2, panels were coated with this powder coating composition and the coatings were cured and evaluated. The coatings had both front and back impact strengths of >160 inch-pounds and 20° and 60° gloss values of 71 and 90, respectively. The results of bend tests, performed as described in Example 2, are set forth in Table I.

COMPARATIVE EXAMPLE 1

A powder coating composition was prepared from the following materials:
320.00 g: Amorphous polyester - AZS 50, described in Example 1;
69.82 g: Caprolactam-blocked isophorone diisocyanate (Hüls 1530);
2.9 g: Dibutyltin dilaurate;
2.9 g: Benzoin;
8.0 g: Modaflow flow control agent; and
160.0 g: Titanium dioxide.

Using the procedure of Example 2, panels were coated with this powder coating composition and the coatings were cured and evaluated. The coatings had both front and back impact strengths of >160 inch-pounds and 20° and 60° gloss values of 77 and 91, respectively. The results of bend tests, performed as described in Example 2, are set forth in Table I (Example C-1).

TABLE I

| Example | 23/0T | 23/2T | 50/0T |
|---|---|---|---|
| 2 | 13,35 | 16,10 | 0,0 |
| 3 | 4,3 | 4,2 | 0,0 |
| 4 | 10,2 | 0,0 | 0,0 |
| 5 | 10,3 | 9,2 | 0,0 |
| 6 | 35,35 | 10,5 | 0,0 |
| C-1 | >100,>100 | >50,>50 | >50,>50 |

The invention has been described in detail with particular reference to preferred embodiments thereof, but it will be understood that variations and modifications will be effected within the spirit and scope of the invention.

I claim:

1. A thermosetting coating composition in the form of a powder having an average particle size of about 10 to 300 microns comprising:
   (1) a blend of polymers containing free hydroxy groups comprised of:
      (a) about 40 to 85 weight percent of an amorphous polyester having a glass transition temperature (Tg) of greater than 40° C., a hydroxyl number of about 20 to 200 and an inherent viscosity of about 0.1 to 0.5; and (b) about 15 to 60 weight percent of a polyether-ester having a Tg of less than 30° C., a hydroxyl number of about 20 to 200 and an inherent viscosity of about 0.1 to 0.5, and comprised of:

(i) diacid residues comprised of about 50 to 90 mole percent terephthalic acid and about 50 to 10 mole percent of 1,4-cyclohexanedicarboxylic acid residues; and (ii) glycol residues comprised of 1,4-butanediol and poly(oxytetramethylene) glycol residues; wherein the poly(oxytetramethylene) residues constitute about 15 to 40 weight percent of the polyether-ester and are derived from a poly(oxytetramethylene) glycol of having molecular weights of about 500 to 2000; and (2) a cross-linking effective amount of a blocked polyisocyanate compound.

2. A thermosetting coating composition according to claim 1 wherein the amorphous polyester has a Tg greater than 55° C., a hydroxyl number of about 25 to 80, an acid number of not more than 20 and an inherent viscosity of about 0.15 to 0.4.

3. A thermosetting coating composition according to claim 1 wherein the polyether-ester has a Tg of less than 0° C., a melting point of 100° to 170° C., a hydroxyl number of about 25 to 80, an acid number of not more than 20 and an inherent viscosity of about 0.15 to 0.4.

4. A thermosetting coating composition according to claim 1 wherein the blocked polyisocyanate compound is an ε-caprolactam-blocked isophorone diisocyanate compound or an ε-caprolactam-blocked 2,4-toluene diisocyanate compound.

5. A thermosetting coating composition according to claim 1 containing a cross-linking catalyst.

6. A thermosetting coating composition according to claim 3 containing a cross-linking catalyst.

7. A thermosetting coating composition in the form of a powder having an average particle size of about 15 to 75 microns comprising:

(1) a blend of polymers containing free hydroxy groups comprised of:

(a) about 50 to 80 weight percent of an amorphous polyester having a glass transition temperature (Tg) of greater than 55° C., a hydroxyl number of about 25 to 80, an acid number of not more than 20 and an inherent viscosity of about 0.15 to 0.45 and comprised of:

(i) diacid residues of which at least 50 mole percent are terephthalic acid residues;

(ii) glycol residues of which at least 50 mole percent are 2,2-dimethyl-1,3-propanediol residues; and (iii) up to 10 mole percent, based on the total moles of (ii), of trimethylolpropane residues (b) about 20 to 50 weight percent of a polyether-ester having a Tg of less than 0° C., a melting point of 100° to 170° C., a hydroxyl number of about 25 to 80, an acid number of not more than 20 and an inherent viscosity of about 0.15 to 0.4 and comprised of:

(i) diacid residues comprised of about 60 to 80 mole percent terephthalic acid and about 20 to 40 mole percent 1,4-cyclohexanedicarboxylic acid residues; and (ii) glycol residues comprised of about 90 to 95 mole percent 1,4-butanediol residues and about 5 to 10 mole percent poly(oxytetramethylene) glycol residues wherein the poly(oxytetramethylene) residues constitute about 20 to 30 weight percent of the polyether-ester and are derived from a poly(oxytetramethylene) glycol having a molecular weight of about 500 to 2000; and (2) about 5 to 30 weight percent, based on the total weight of the amorphous polyester, the polyether-ester and the blocked isocyanate, of a blocked polyisocyanate compound.

8. A thermosetting coating composition according to claim 7 wherein the blocked polyisocyanate compound is an ε-caprolactam-blocked isophorone diisocyanate compound or an ε-caprolactam-blocked 2,4-toluene diisocyanate compound.

9. A thermosetting coating composition according to claim 7 containing about 15 to 25 weight percent, based on the total weight of the amorphous polyester, the polyether-ester and the blocked polyisocyanate, of a blocked polyisocyanate.

10. A thermosetting coating composition according to claim 9 wherein the blocked polyisocyanate compound is an ε-caprolactam-blocked isophorone diisocyanate compound or an ε-caprolactam-blocked 2,4-toluene diisocyanate compound.

11. A thermosetting coating composition according to claim 7 containing a cross-linking catalyst and a flow aid.

12. A thermosetting coating composition according to claim 11 containing about 15 to 25 weight percent, based on the total weight of the amorphous polyester, the polyether-ester and the blocked polyisocyanate, of a blocked polyisocyanate selected from an ε-caprolactam-blocked isophorone diisocyanate compound or an ε-caprolactam-blocked 2,4-toluene diisocyanate compound.

13. A thermosetting coating composition in the form of a powder having an average particle size of about 15 to 50 microns comprising:

(1) a blend of polymers containing free hydroxy groups comprised of:

(a) about 25 to 50 weight percent of an amorphous polyester having a glass transition temperature (Tg) of about 50° to 65° C., a hydroxyl number of about 35 to 60, an acid number of not more than 10 and an inherent viscosity of about 0.1 to 0.25 and consisting essentially of terephthalic acid residues, 2,2-dimethyl-1,3-propanediol residues and up to 10 mole percent, based on the total moles of trimethylolpropane and 2,2-dimethyl-1,3-propanediol residues, of trimethylolpropane residues;

(b) about 25 to 50 weight percent of a polyether-ester having a Tg of less than 0° C., a melting point of 100° to 170° C., a hydroxyl number of about 25 to 80, an acid number of not more than 20 and an inherent viscosity of about 0.15 to 0.4 and comprised of:

(i) diacid residues comprised of about 60 to 80 mole percent terephthalic acid and about 20 to 40 mole percent of 1,4-cyclohexanedicarboxylic acid residues; and (ii) glycol residues comprised of about 90 to 95 mole percent 1,4-butanediol residues and about 5 to 10 mole percent poly(oxytetramethylene) glycol residues
wherein the poly(oxytetramethylene) glycol residues constitute about 20 to 30 weight percent of the polyether-ester and are derived from a poly(oxytetramethylene) glycol having a molecular weight of about 500 to 2000;

(2) about 15 to 25 weight percent, based on the total weight of the amorphous polyester, the polyether-ester and the blocked isocyanate, of a blocked polyisocyanate compound selected from an ε-caprolactam-blocked isophorone diisocyanate compound or ε-caprolactam-blocked 2,4-toluene diisocyanate compound;

(3) an acrylic polymer flow aid; and (4) a cross-linking catalyst selected from organotin compounds.

14. A thermosetting coating composition according to claim 13 wherein the polyether-ester component is comprised of about 70 mole percent terephthalic acid residues, 30 mole percent 1,4-cyclohexanedicarboxylic acid residues, 1,4-butanediol residues and poly(oxytetramethylene) glycol residues derived from poly(oxytetramethylene) glycol having a molecular weight of 1000, wherein the poly(oxytetramethylene) glycol residues constitute about 25 weight percent of the polyether-ester.

15. An article coated with the reaction product of a composition comprising:
  (1) a blend of polymers containing free hydroxy groups comprised of:
    (a) about 40 to 85 weight percent of an amorphous polyester having a glass transition temperature (Tg) of greater than 40° C., a hydroxyl number of about 20 to 200 and an inherent viscosity of about 0.1 to 0.5; and
    (b) about 15 to 60 weight percent of a polyether-ester having a Tg of less than 30° C., a hydroxyl number of about 20 to 200 and an inherent viscosity of about 0.1 to 0.5, and comprised of:
      (i) diacid residues comprised of about 50 to 90 mole percent terephthalic acid and about 50 to 10 mole percent of 1,4-cyclohexanedicarboxylic acid residues; and
      (ii) glycol residues comprised of 1,4-butanediol and poly(oxytetramethylene) glycol residues wherein the poly(oxytetramethylene) residues constitute about 15 to 40 weight percent of the polyether-ester and are derived from a poly(oxytetramethylene) glycol having molecular weights of about 500 to 2000; and
  (2) a cross-linking effective amount of a blocked polyisocyanate compound.

16. An article according to claim 15 constructed of a metal coated with the reaction product of a composition comprising:
  (1) a blend of polymers containing free hydroxy groups comprised of:
    (a) about 50 to 80 weight percent of an amorphous polyester having a glass transition temperature (Tg) of greater than 55° C., a hydroxyl number of about 25 to 80, an acid number of not more than 20 and an inherent viscosity of about 0.15 to 0.45 and comprised of:
      (i) diacid residues of which at least 50 mole percent are terephthalic acid residues;
      (ii) glycol residues of which at least 50 mole percent are 2,2-dimethyl-1,3-propanediol residues; and
      (iii) up to 10 mole percent, based on the total moles of (ii), of trimethylolpropane residues
    (b) about 20 to 50 weight percent of a polyether-ester having a Tg of less than 0° C., a melting point of 100° to 170° C., a hydroxyl number of about 25 to 80, an acid number of not more than 20 and an inherent viscosity of about 0.15 to 0.4 and comprised of:
      (i) diacid residues comprised of about 60 to 80 mole percent terephthalic acid and about 20 to 40 mole percent of 1,4-cyclohexanedicarboxylic acid residues; and
      (ii) glycol residues comprised of about 90 to 95 mole percent 1,4-butanediol residues and about 5 to 10 mole percent poly(oxytetramethylene) glycol residues wherein the poly(oxytetramethylene) residues constitute about 20 to 30 weight percent of the polyether-ester and are derived from a poly(oxytetramethylene) glycol having a molecular weight of about 500 to 2000; and
  (2) about 5 to 30 weight percent, based on the total weight of the amorphous polyester, the polyether-ester and the blocked isocyanate, of a blocked polyisocyanate compound.

17. A coated article according to claim 16 wherein the article is constructed of steel.

18. An article according to claim 15 constructed of steel coated with the reaction product of a composition comprising:
  (1) a blend of polymers containing free hydroxy groups comprised of:
    (a) about 50 to 75 weight percent of an amorphous polyester having a glass transition temperature (Tg) of about 50° to 65° C., a hydroxyl number of about 35 to 60, an acid number of not more than 10 and an inherent viscosity of about 0.10 to 0.25 and consisting essentially of terephthalic acid residues, 2,2-dimethyl-1,3-propanediol residues and up to 10 mole percent, based on the total moles of trimethylolpropane and 2,2-dimethyl-1,3-propanediol residues, of trimethylolpropane residues;
    (b) about 25 to 50 weight percent of a polyether-ester having a Tg of less than 0° C., a melting point of 100° to 170° C., a hydroxyl number of about 25 to 80, an acid number of not more than 20 and an inherent viscosity of about 0.15 to 0.4 and comprised of:
      (i) diacid residues comprised of about 60 to 80 mole percent terephthalic acid and about 20 to 40 mole percent of 1,4-cyclohexanedicarboxylic acid residues; and
      (ii) glycol residues comprised of about 90 to 95 mole percent 1,4-butanediol residues and about 5 to 10 mole percent poly(oxytetramethylene) glycol residues
      wherein the poly(oxytetramethylene) residues constitute about 20 to 30 weight percent of the polyether-ester and are derived from a poly(oxytetramethylene) glycol having a molecular weight of about 500 to 2000; and
  (2) about 15 to 25 weight percent, based on the total weight of the amorphous polyester, the polyether-ester and the blocked isocyanate, of a blocked polyisocyanate compound selected from an ε-caprolactam-blocked isophorone diisocyanate compound or an ε-caprolactam-blocked 2,4-toluene diisocyanate compound;

said composition also containing an acrylic polymer flow aid and a cross-linking catalyst selected from organo-tin compounds.

19. A blend of polymers containing free hydroxyl groups suitable for use in coating compositions comprised of:
(a) about 40 to 85 weight percent of an amorphous polyester having a glass transition temperature (Tg) of greater than 40° C., a hydroxyl number of about 20 to 200 and an inherent visosity of about 0.1 to 0.5; and
(b) about 15 to 60 weight percent of a polyether-ester having a Tg of less than 30° C., a hydroxyl number of about 20 to 200 and an inherent viscosity of about 0.1 to 0.5, and comprised of:
  (i) diacid residues comprised of about 50 to 90 mole percent terephthalic acid and about 50 to 10 mole percent of 1,4-cyclohexanedicarboxylic acid residues; and
  (ii) glycol residues comprised of 1,4-butanediol and poly(oxytetramethylene) glycol residues
  wherein the poly(oxytetramethylene) residues constitute about 15 to 40 weight percent of the polyether-ester and are derived from a poly(oxytetramethylene) glycol having molecular weights of about 500 to 2000.

20. A blend of polymers containing free hydroxy groups according to claim 19 comprised of:
(a) about 50 to 80 weight percent of an amorphous polyester having a glass transition temperature (Tg) of greater than 55° C., a hydroxyl number of about 25 to 80, and acid number of not more than 20 and an inherent viscosity of about 0.15 to 0.45 and comprised of:
  (i) diacid residues of which at least 50 mole percent are terephthalic acid residues;
  (ii) glycol residues of which at least 50 mole percent are 2,2-dimethyl-1,3-propanediol residues; and
  (iii) up to 10 mole percent, based on the total moles of (ii), of trimethylolpropane residues
(b) about 20 to 50 weight percent of a polyether-ester having a Tg of less than 0° C., a melting point of 100° to 170° C., a hydroxyl number of about 25 to 80, an acid number of not more than 20 and an inherent viscosity of about 0.15 to 0.4 and comprised of:
  (i) diacid residues comprised of about 60 to 80 mole percent terephthalic acid and about 20 to 40 mole percent of 1,4-cyclohexanedicarboxylic acid residues; and
  (ii) glycol residues comprised of about 90 to 95 mole percent 1,4-butanediol residues and about 5 to 10 mole percent poly(oxytetramethylene) glycol residues
  wherein the poly(oxytetramethylene) residues constitute about 20 to 30 weight percent of the polyether-ester and are derived from a poly(oxytetramethylene) glycol having a molecular weight of about 500 to 2000.

21. A blend of polymers containing free hydroxyl groups according to claim 19 comprised of:
(a) about 50 to 75 weight percent of an amorphous polyester having a glass transition temperature (Tg) of about 50° to 60° C., a hydroxyl number of about 35 to 60, an acid number of not more than 10 and an inherent viscosity of about 0.10 to 0.25 and consisting essentially of terephthalic acid residues, 2,2-dimethyl-1,3-propanediol residues and up to 10 mole percent, based on the total moles of trimethylolpropane and 2,2-dimethyl-1,3-propanediol residues, of trimethylolpropane residues;
(b) about 25 to 50 weight percent of a polyether-ester having a Tg of less than 0° C., a melting point of 100° to 170° C., a hydroxyl number of about 25 to 80, an acid number of not more than 20 and an inherent viscosity of about 0.15 to 0.4 and comprised of:
  (i) diacid residues comprised of about 60 to 80 mole percent terephthalic acid and about 20 to 40 mole percent of 1,4-cyclohexanedicarboxylic acid residues; and
  (ii) glycol residues comprised of about 90 to 95 mole percent 1,4-butanediol residues and about 5 to 10 mole percent poly(oxytetramethylene) glycol residues
  wherein the poly(oxytetramethylene) residues constitute about 20 to 30 weight percent of the polyether-ester and are derived from a poly(oxytetramethylene) glycol having a molecular weight of about 500 to 2000.

* * * * *